May 13, 1924.
Re. 15,838
F. P. LAWLER
HIGH TENSION DISCONNECTING SWITCH
Original Filed Aug. 15, 1921 3 Sheets-Sheet 1
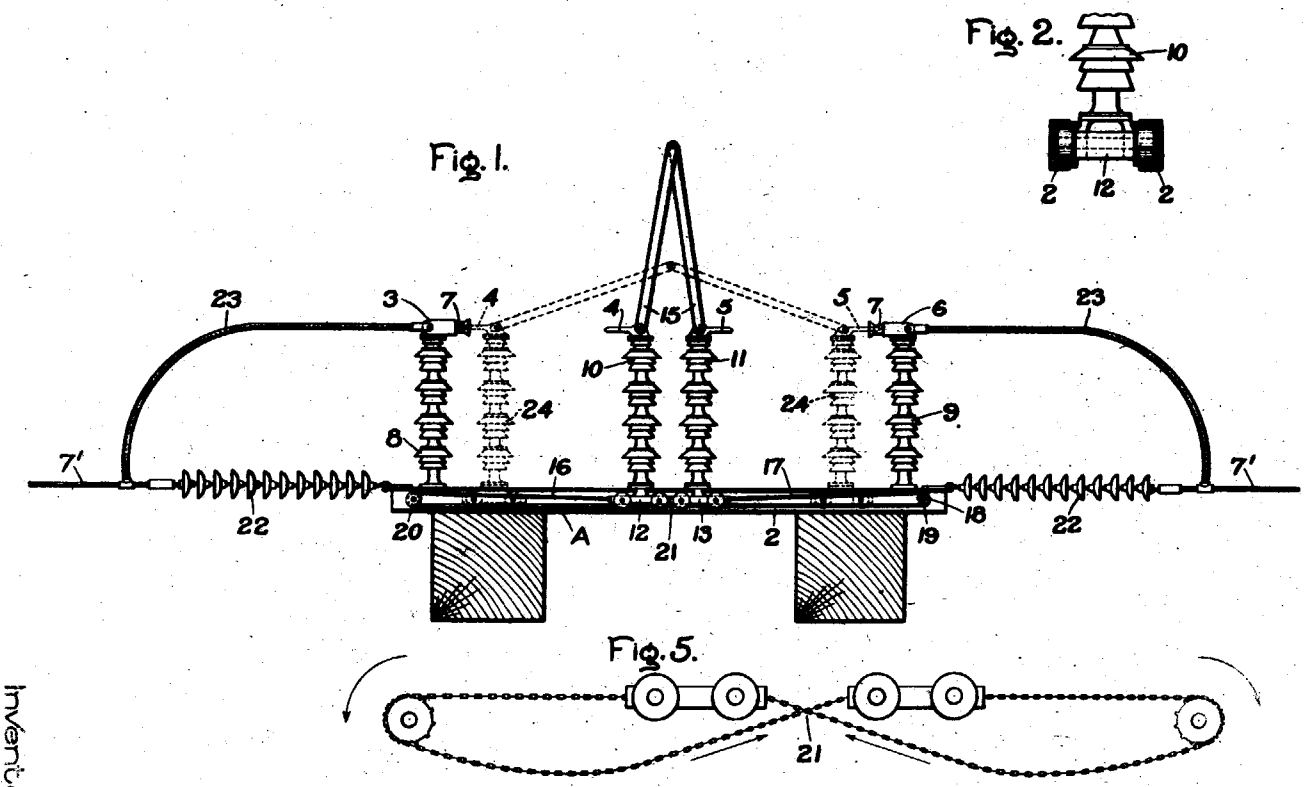
Inventor:
Frank P. Lawler,
by Alexander S. Lane
His Attorney.

May 13, 1924. Re. 15,838

F. P. LAWLER

HIGH TENSION DISCONNECTING SWITCH

Original Filed Aug. 15, 1921 3 Sheets-Sheet 2

Inventor:
Frank P. Lawler,
by Alexander S. Funk
His Attorney.

May 13, 1924. Re. 15,838

F. P. LAWLER

HIGH TENSION DISCONNECTING SWITCH

Original Filed Aug. 15, 1921 3 Sheets-Sheet 3

Inventor:
Frank P. Lawler,
by Alexander S. Lane
His Attorney.

Reissued May 13, 1924. Re. 15,838

UNITED STATES PATENT OFFICE.

FRANK P. LAWLER, OF SAN FRANCISCO, CALIFORNIA, ASSIGNOR TO GENERAL ELECTRIC COMPANY, A CORPORATION OF NEW YORK.

HIGH-TENSION DISCONNECTING SWITCH.

Original No. 1,434,368, dated August 7, 1923, Serial No. 492,583, filed August 15, 1921. Application for reissue filed March 12, 1924. Serial No. 698,784.

*To all whom it may concern:*

Be it known that I, FRANK P. LAWLER, a citizen of the United States, residing at the city and county of San Francisco and State of California, have invented new and useful Improvements in High-Tension Disconnecting Switches, of which the following is a specification.

This invention relates to electric switches, and especially to a disconnecting switch adapted for the control of extra high tension electric circuits where a great length of clear separation between the contacts is required within a minimum of space.

One of the objects of the present invention is to generally improve and simplify switches of the character described, and especially to provide a switch in which the contacts are arranged in line formation and movable in a common plane, and in which large clearance between the contacts is obtained in a minimum of space. Another object of the invention is to obtain a switch which has no tendency to change its setting through the influence of gravity following the mechanical failure of any part; and further, to provide a switch which may be disposed either above or below a suitable support with equal facility. Further objects will hereinafter appear.

The invention consists of the parts and the construction and combination of parts as hereinafter more fully described and claimed, having reference to the accompanying drawings, in which—

Fig. 1 is a side elevation of a double-break, sectionalizing switch employing the carriage type of operating mechanism.

Fig. 2 is a detailed cross section of the base, showing the position of one of the carriages.

Fig. 5 is a view in diagram showing the operating means for the carriages.

Figure 3:
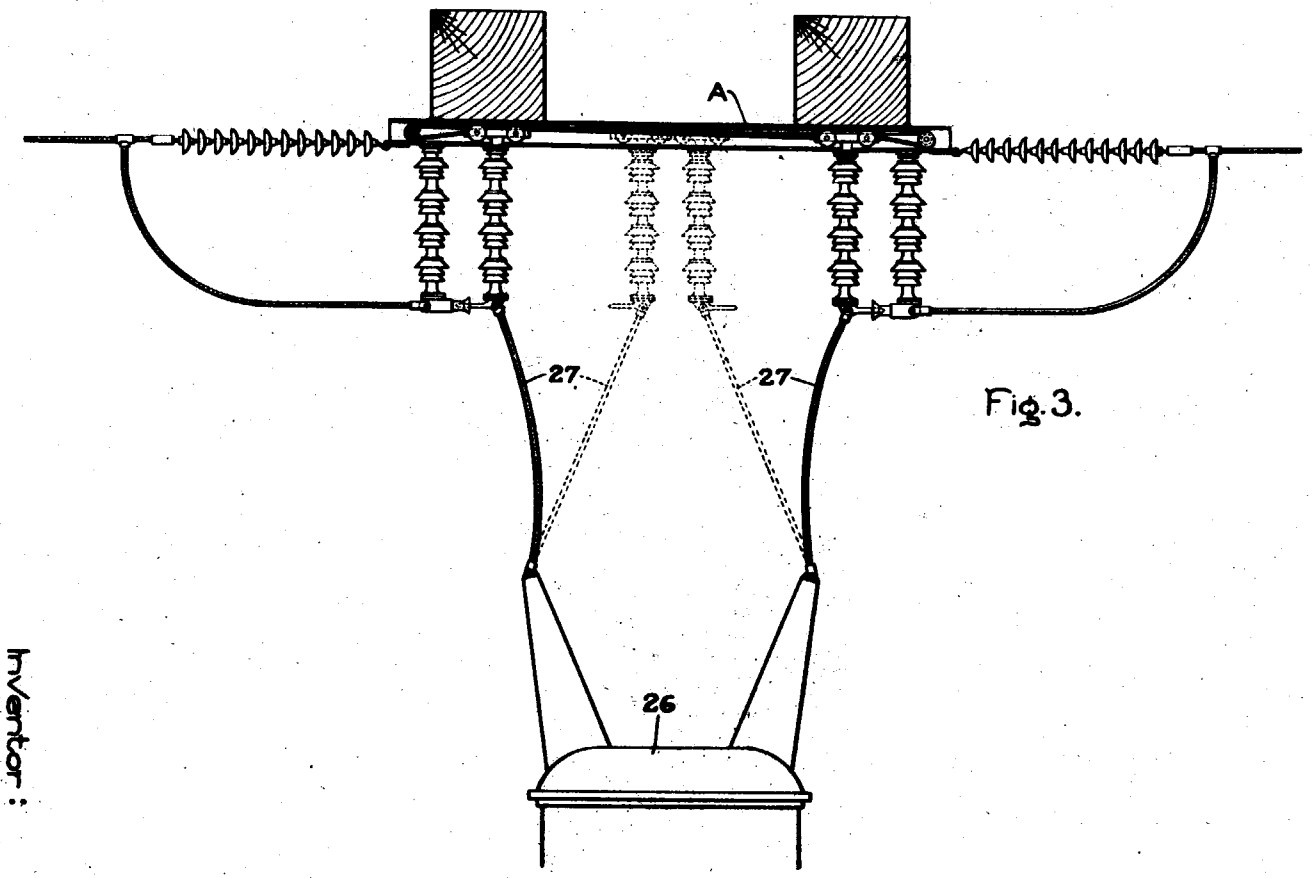
Fig. 3 is a side elevation of a double disconnecting switch which may be used for isolating an oil circuit breaker, said switch also employing the carriage type of operating mechanism.

Referring to the drawings in detail, and particularly Figs. 1 and 2, A indicates a base, upon which the switch is mounted. The base in this instance consists of a pair of interspaced channel beams 2, upon which are supported a plurality of contacts, such as indicated at 3, 4, 5 and 6. The contacts for opening and closing the circuit through the main line shown engaged at 7 are of the well-known bayonet and socket type. Two of the contacts are stationary and are rigidly secured to pillar insulators of suitable insulating capacity for the voltage employed, said insulators being indicated at 8 and 9. The remaining contacts 4 and 5 are similarly supported by pillar insulators, as shown at 10 and 11, but they are movable with relation to the stationary contacts, as will hereinafter be described.

To accomplish this movement the pillars 10 and 11 are each supported by a carriage, as shown at 12 and 13, respectively. The carriages are supported by rollers and the rollers are in turn disposed between the channel beams which form tracks and guides therefor. The contacts 4 and 5 are connected by means of a pair of toggle links 15, while the carriages 12 and 13 are connected by means of an endless cable 16. Forming a portion of the cable is a sprocket chain 17, and adapted to support this end of the cable is a sprocket gear 18 which is secured on a shaft 19; this shaft being provided with a hand wheel or other means by which turning movement may be imparted. The opposite end of the cable passes over an idler pulley 20. The cable is otherwise crossed, as shown at 21, to permit the carriages to move in opposition to each other when the circuit through the contacts is to be established or broken.

The line conductors, shown at 7′, are insulated with relation to the base A by means of dead end insulators 22, and a connection is formed between the line conductors and the contacts 3 and 6 by means of jumper connections 23.

In actual operation if it is desired to close the circuit between the line conductors, it is only necessary to turn the shaft 19 in one direction. This turning movement will be transmitted to the cable connecting the carriages by means of the chain section 17 and the carriages will move away from each other until the dotted line position, shown at 24, is assumed; the circuit between the line conductors being then established, as the toggle links or a conductor of suitable capacity attached to the same forms a connection between the contacts 4 and 5. Again, if it is desired to break the circuit between the line conductors, it is only necessary to turn shaft 19 in the opposite direction. Such turning movement will cause the carriages to move together or assume the central position shown in Fig. 1. A large air gap will then be formed between the contacts 3 and 4 and similarly between the contacts 5 and 6, thus positively breaking the circuit through the line conductors.

In cases where a gang of switches is provided, as in opening the circuit on a polyphase line, the base A will naturally be constructed in the same manner for each of the several switches. The contacts of each of the switches are arranged in line formation, as shown in Fig. 1, and the switches are separated laterally only a sufficient distance to obtain the air gap or insulation required. The switch may thus be duplicated as many times as required and the shaft 19 may be extended so that all switches may be operated in unison.

The switch as shown and described in Fig. 1 is practically identical with the modified form shown in Fig. 3. The switch there illustrated is a disconnecting switch for isolating an oil circuit breaker 26 for inspection or other purposes. The switch shown in Fig. 3 is constructed like that illustrated in Fig. 1; one difference being that the insulating pillars and the contacts carried thereby are suspended or disposed below the base instead of above the same, as shown in Fig. 1. The toggle links are also eliminated and yieldable connections consisting of heavy flexible conductors 27 are substituted therefor, said conductors forming the circuit between the oil circuit breaker and the movable contacts.

Figure 4:
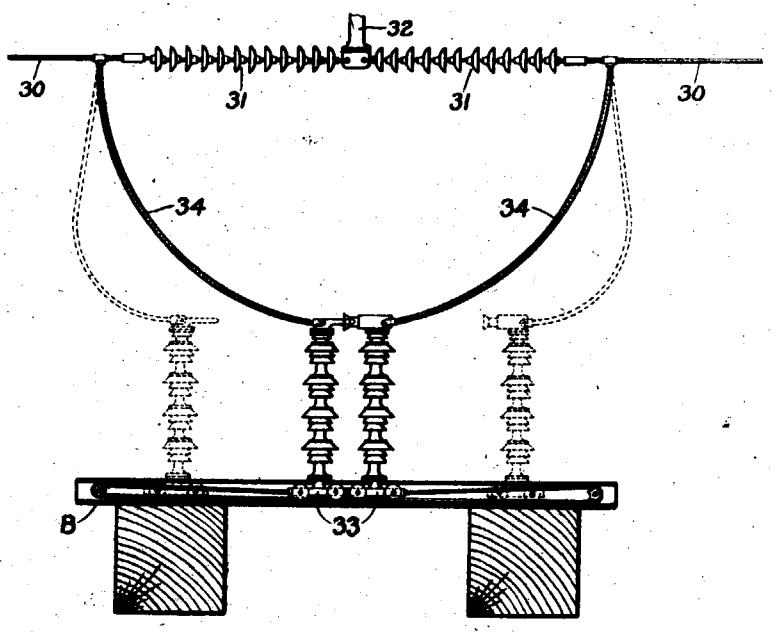
Fig. 4 is a side elevation of a single-break sectionalizing switch employing the carriage type of operating mechanism.

In Fig. 4 a single-break sectionalizing switch is shown. The main line, indicated at 30, is in this instance connected with a pair of dead end insulators 31 which in turn are secured to a tower arm 32 or like support. Disposed below the tower arm is a base member B, and mounted thereon is a pair of carriages 33. Each carriage forms a support for a pillar insulator and each insulator, in turn, carries a contact which is connected by means of a yieldable connection consisting of a flexible conductor or jumper 34 with the line conductors 30. In other words, a single-break switch is employed in which both contacts are movable; this being accomplished by mounting the contacts on separate carriages which are movable to and away from each other by the same mechanism as that indicated in Fig. 1. A comparatively compact, simple switch is in this manner produced and a large separation is obtained between the contacts when the circuit is broken without resorting to the use of unnecessary space. In fact, one of the important features of the present invention is the provision of a switch which permits the formation of considerable clearance between the contacts when they are separated, a switch in which overhead clearance may be reduced to a minimum and in which cost of installation and construction is low compared with the other switches of this type.

This can readily be appreciated when it is stated that any blade switches opening into a vertical plane naturally require a large overhead clearance. Similarly any blade switches rotating in a horizontal plane require extraordinary separation between the several switches where they are arranged in group formation. All such unnecessary clearance is avoided in the present instance as the only separation required between switches in a gang is only such as is required for insulation. This is due to the fact that the contacts of each individual switch are arranged in line formation and travel in said line formation when closing or breaking the circuits.

While bayonet contacts are here illustrated, it is obvious that any other form of contact may be employed and also that changes may be made in the design and construction and that the materials and finish of the several parts may be such as the experience and judgment of the manufacturer may dictate or varying conditions may demand.

Having thus described my invention what I claim and desire to secure by Letters Patent is—

1. An electric switch comprising a base member, insulators movably supported by said base member, a pair of alined contacts carried by said insulators, and means for imparting movement to said insulators to move said contacts simultaneously in opposite directions on a common plane and on a common longitudinal axis to make or break a circuit through said contacts.

2. An electric switch comprising a base member, a plurality of contacts arranged in line formation and supported by the base, and means for imparting movement to a plurality of the contacts simultaneously in opposite directions on a common plane and in said line formation to make or break a circuit at two points.

3. An electric switch comprising a base member, a plurality of stationary and movable contacts arranged in line formation and supported upon the base, and means for imparting movement to the movable contacts simultaneously in opposite directions on a common plane and in said line formation to open or close a circuit through the contacts.

4. An electric switch comprising a support, a guideway thereon, a pair of stationary contacts, a pair of contacts insulated with relation to the guideway and movable therein and located between and in alignment with the stationary contacts, and means for imparting movement to the contacts to and away from each other.

5. An electric switch comprising a base member, a trackway formed thereon, a stationary contact disposed at each end of the trackway and insulated therefrom, a pair of movable contacts supported by the trackway and insulated therefrom, said movable contacts being interposed between the stationary contacts and all of said contacts being arranged in line formation, and means for imparting movement to the movable contacts simultaneously in opposite directions to and away from the stationary contacts.

6. An electric switch comprising a base member, a straight trackway secured thereto, an insulating pillar disposed at each end of the trackway, a contact carried by each pillar, a pair of carriages supported by the trackway and disposed between the stationary pillars, an insulating pillar supported by each carriage, a contact supported by each last named insulating pillar, means connecting said last named contacts and permitting separation of the same, and means for imparting movement to the carriages along the trackway simultaneously in opposite directions to move the movable contacts to and away from the stationary contacts.

7. An electric switch comprising a base member, a straight trackway secured thereto, an insulating pillar disposed at each end of the trackway, a contact carried by each pillar, a pair of carriages supported by the trackway and disposed between the stationary pillars, an insulating pillar supported by each carriage, a contact supported by each last named insulating pillar, means connecting said last named contacts and permitting separation of the same, an endless cable connected with the carriages, a driving and an idler pulley supporting the same, said cable being crossed to move the carriages simultaneously in opposite directions, and means for imparting movement to the driving pulley.

8. In a switch of the character described, a straight trackway, a pair of carriages guided and supported by the trackway, an insulating pillar on each carriage, a contact on the upper end of each insulating pillar, means for moving the carriages simultaneously in opposite directions, an electric conducting line, a dead end insulator interposed in said line, and a flexible conductor connecting each dead end of the line with the respective contacts.

9. In a switch of the character described, a straight track member, a dead end insulator disposed at each end of the track member, a line conductor connected to each dead end insulator, a stationary pillar insulator supported at each end of the track member, a contact disposed on the upper end of each of said insulators, a jumper connection between each end of the line conductors and said contacts, and a pair of connected contacts movable simultaneously in opposite directions in line formation between the stationary contacts.

10. In a switch of the character described, a pair of line conductors, dead end insulators separating the same, a pair of pillar insulators disposed adjacent to each dead end insulator, a contact on the upper end of each pillar insulator, means connecting said contacts with the line conductors, and a pair of connected contact members disposed between the first named contacts and movable in line formation simultaneously in opposite directions between said contacts to make or break a circuit through the same.

11. In a switch of the character described, a base having a straight trackway, insulating pillars located at the ends of the trackway, stationary contacts supported on the upper ends of the said pillars, line conductors connected with the stationary contacts, and means located in alignment with the stationary contacts for opening and closing a circuit through the line conductors, said means including a carriage movable along the trackway, an insulating pillar mounted on the said carriage, a movable contact supported by the insulating pillar of the carriage and toggle links connected with the movable contact.

12. A switch of the character described comprising in combination with a power line a base having a straight trackway in longitudinal alignment with the power line and interposed in a break in said line, fixed insulating pillars disposed at the ends of said trackway, stationary contacts supported by said pillars and receiving the free ends of the line at the break thereof, and means movable along the trackway and in an aligned path with the power line to establish an electrical connection between the contacts carried by the fixed pillars, said means comprising a movable pillar, a movable contact supported thereby and permanent articulate connections carried by the movable pillar for establishing an electrical connection between the contacts on fixed pillars.

13. In a switch of the character described, a base having a trackway, fixed insulators located at the ends of said trackway arranged to support terminal members for the respective ends of a line conductor to be controlled by the switch, a carriage movable along said trackway, an insulator mounted on said carriage, cooperating contacts one of which is carried by said movable insulator mounted on the carriage and the other of which is carried by one of said fixed insulators and serves as the terminal member for one end of the line conductor, and means including a yielding connection secured to said movable contact for completing the circuit from the movable contact to the other line terminal member when the carriage is moved to cause engagement of said contacts whereby the circuit through the line conductor may be opened or closed upon operation of said carriage along said trackway.

14. An electric switch of the class described comprising a base member, a plurality of insulators supported by said base member, cooperating contacts supported by said insulators, and means whereby movement along said base member may be imparted to a plurality of said insulators to move said contacts in line formation toward and from each other to cause engagement or disengagement of the contacts.

15. An electric switch of the class described comprising a base member, a plurality of insulators, cooperating pairs of contacts arranged in line formation supported by said insulators, and means whereby a plurality of insulators may be moved in opposite directions along said base member to make or break a circuit through said contacts at a plurality of points.

In witness whereof, I have hereunto set my hand this 29th day of February, 1924.

FRANK P. LAWLER.